Aug. 17, 1948.    W. L. LANGLEY    2,447,188
RECEPTACLE FOR VEHICLES
Filed June 8, 1945    2 Sheets-Sheet 1
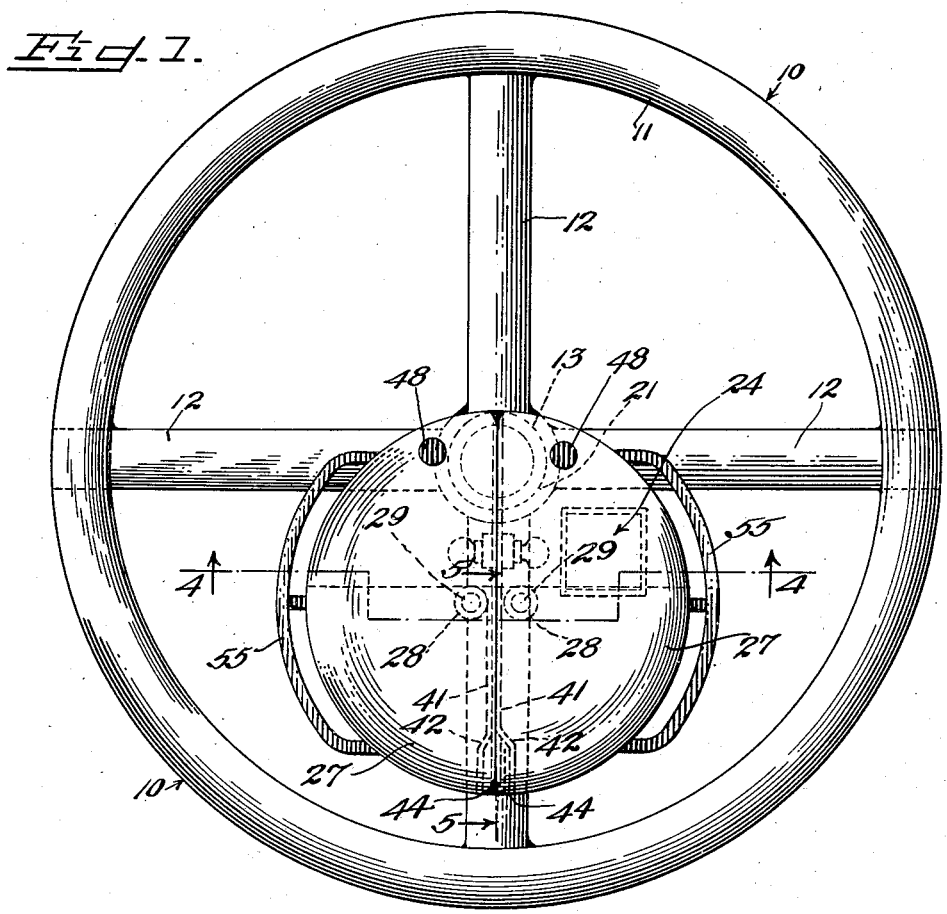
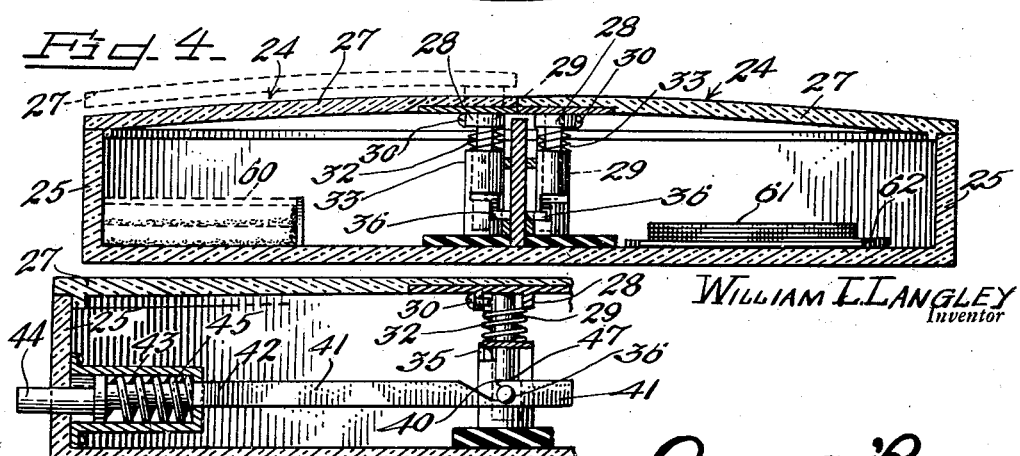
WILLIAM L. LANGLEY
Inventor
By Clarence A. O'Brien
and Harvey B. Jacobson
Attorneys Aug. 17, 1948.  W. L. LANGLEY  2,447,188
RECEPTACLE FOR VEHICLES
Filed June 8, 1945  2 Sheets-Sheet 2
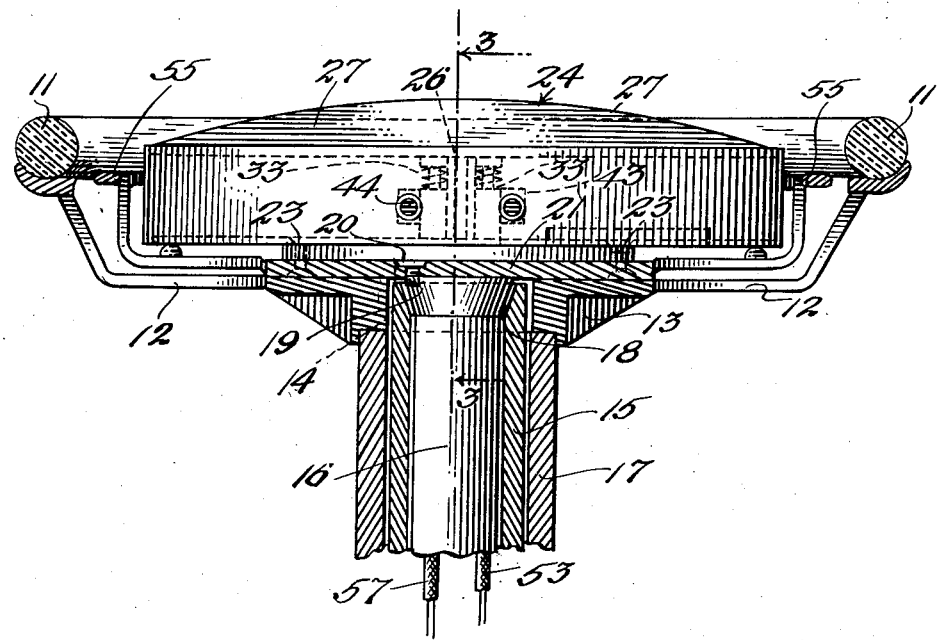
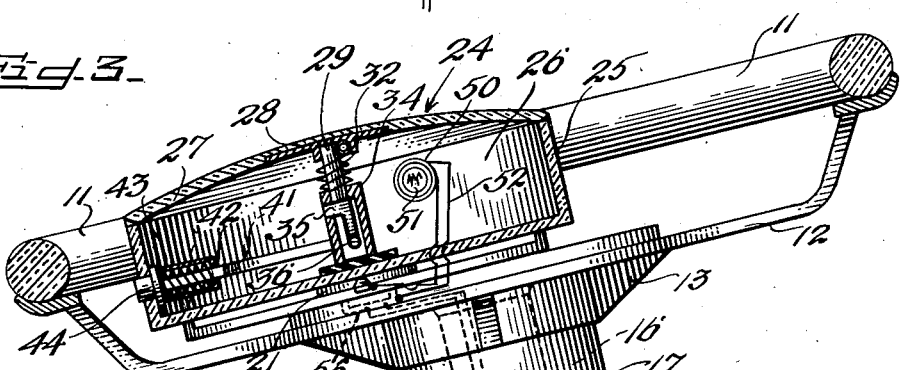
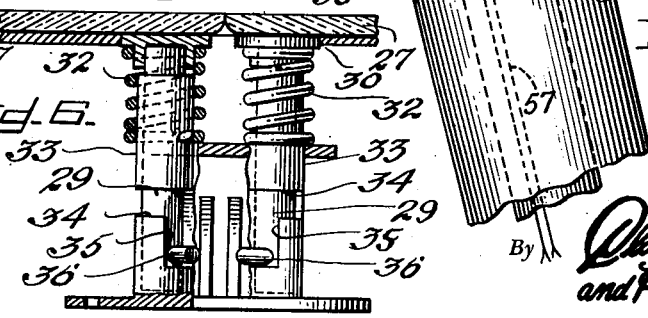
WILLIAM L. LANGLEY
Inventor Patented Aug. 17, 1948

2,447,188

UNITED STATES PATENT OFFICE 2,447,188

RECEPTACLE FOR VEHICLES

William L. Langley, Locust Grove, Okla.

Application June 8, 1945, Serial No. 598,232

6 Claims. (Cl. 206—19.5)

This invention relates to a receptacle for vehicles, and more particularly to such a receptacle adapted to be positioned within the rim of the steering wheel of the vehicle.

A primary object of this invention is the provision of an improved receptacle adapted to be associated with the steering post of a vehicle and positioned within the rim of the steering wheel, and so arranged as to remain stationary regardless of the rotation of the steering wheel.

Another important object of this invention is the provision of a receptacle adapted to be positioned in space which would otherwise be wasted, which may be utilized to contain cigarettes, matches, writing materials, such as notebook and pencil, powder, lipstick, or any other desired commodity, in such position that the articles contained in the receptacle are readily accessible to the driver of the vehicle.

A further and more specific object of this invention is the provision of such a receptacle so located and positioned as not to interfere with the visibility of the instruments on the instrument panel of the vehicle through the steering wheel.

A further object is the provision of an improved means for opening the receptacle in such manner that the position of the cover thereof when opened does not interfere with either the vision of the driver, or the operation of the vehicle.

Still another object of the invention is the provision of such a device which will be sturdy and durable in construction, reliable and efficient in operation, and relatively simple and inexpensive to manufacture and install in a vehicle.

Other objects reside in the combinations of elements, arrangements of parts, and features of construction, all as will be more fully pointed out hereinafter and disclosed in the accompanying drawings wherein there is shown a preferred embodiment of this inventive concept.

In the drawings:

Figure 1 is a top plan view of the receptacle of the instant invention shown in association with the steering wheel of a vehicle, certain concealed parts thereof being indicated by dotted lines.

Figure 2 is a side view partially in section and partially in elevation, disclosing the mounting of the receptacle on the steering wheel of the vehicle.

Figure 3 is a sectional view taken substantially along the line 3—3 of Figure 2 as viewed in the direction indicated by the arrows.

Figure 4 is an enlarged sectional view taken substantially along the line 4—4 of Figure 1, as viewed in the direction indicated by the arrows, certain alternative positions of certain of the parts being indicated by dotted lines.

Figure 5 is a fragmentary sectional view taken substantially along the line 5—5 of Figure 1, as viewed in the direction indicated by the arrows.

Figure 6 is an enlarged fragmentary detail view more clearly showing part of the construction seen in Figure 4.

Similar reference characters refer to similar parts throughout the several views of the drawings.

Having reference now to the drawings, there is generally indicated at 10 the steering wheel of a vehicle, comprised of a rim 11 and spokes 12. The spokes 12 terminate in a hub 13, adapted to be secured, as by means of splines or keys 14 (see Figure 2) to a sleeve 15, rotatable about a central stationary post 16. The sleeve 15 is surrounded by a stationary steering post housing 17, and the arrangement is preferably such that the post 16 and housing 17 are passed through the floorboard of the car and fixed to the vehicle frame while the sleeve 15 is adapted to rotate in the conventional manner to effect the steering of the car through suitable gearing and connections (not shown).

The upper end of the sleeve 15 is tapered as at 18 to accommodate an inverted frusto-conical portion 19 of the post 16, in such manner that suitable adjustment may be made therebetween for wear or the like. The hub 13 is adapted to rotate on the upper extremity of the housing 17, and, if desired, suitable bearing means (not shown) may be positioned between the hub and the housing.

Secured as by bolts or screws 20 to the upper extremity of the post 16 and preferably for forward or rearward adjustment, by passing the bolts 20 through slots or adjustment holes at 20, is a plate 21 to which in turn is secured in any desired manner as by rivets 23 the base of the receptacle, generally indicated at 24, of the instant invention.

The housing 24 is, as best shown in Figure 1, preferably circular in shape, although other forms may be utilized if desired. In the mounting of the device, it is preferable that the receptacle 24 be secured to the plate 21, in such manner that the device may be positioned toward the lower half of the steering wheel, thus permitting an unobstructed vision by the operator of the instruments on the instrument panel.

The receptacle 24 is comprised of a circular or cylindrical body portion 25, having a transverse partition 26 extending therethrough, preferably extending in a direction in alignment with the longitudinal axis of the vehicle to provide two semi-cylindrical compartments equi-distant from the vehicle operator. The compartments are adapted to be covered by a pair of semi-circular cover members 27, the dividing line of the cover members being in alignment with the partition. Each of the cover members 27 is provided at substantially the mid-point of its flat side with a collar 28, within which is secured the extremity of a post 29, as by means of a set screw 30 or the like. Each of the posts 29 is encircled by a coiled compression and torsion spring 32. The posts are rotatably positioned in sleeves 33, the ends of the springs 32 thus biasing the posts upwardly within the sleeves. Each of the sleeves 33 is provided at an intermediate portion with a semi-circular slot 34 communicating with a vertical slot 35. A pin 36 extends into the vertical slot 35, and outwardly of each of the sleeves 33.

Each of the pins 36 is adapted normally to be held in the base of the associated vertical slot 35 as by means of a latch member 40 cut into a transversely extending bar 41, which is offset laterally at 42. The bar 41 extends into a housing 43, and terminates at a push button 44 extending outwardly through the side wall of the receptacle. A compression spring 45 in the housing 43 and and surrounding the bar 41 normally biases the push button 44 outwardly, and hence the latch member 40 over its associated pin 36. The upper portion of the latch 40 is provided with a projection 47, adapted to be engaged by the pin, to force the same into latching engagement therewith, subsequent to release in the manner and for a purpose now to be described.

When it is desired to open either half of the receptacle, the associated push button 44 is pushed releasing the engagement of the latch 40 with the pin 36. Upon release of the engagement of the latch and pin, the spring 32 tends to bias the post 29, and its associated cover 27 upwardly a limited distance until the pin strikes the upper extremity of the vertical slot 35. The lid and its associated post is now being rotated by the spring 32 through an arc of 180°, until the cover thus released overlies the cover of the opposite half of the cylindrical receptacle, whereupon ready access may be had to the contents thereof. During such rotation the pin 36 is permitted to travel in the horizontal slot 34, which extends about the sleeve 33 to a sufficient extent to permit full 180° rotation. Obviously, when it is desired to reclose the receptacle, the reverse procedure is followed a finger being engaged in the recess 48 of the cover to turn the latter until the cover 27 is in proper aligned position, whereupon the same is pushed downwardly and the cam surface 47 permits the pin to move the latch in such manner as to be reengaged thereby, thus effectively closing the receptacle. Equally obviously, either side of the receptacle may be opened in a similar manner. Pin 36 may seat in a notch at the top of slot 34 to hold the cover open.

Each of the receptacle portions may be provided with a light socket 50 adapted to have a light bulb 51 positioned therein and connected as by wires 52 with a main lead in wire 53, which may extend upwardly through a suitable bore or aperture in the central post 16. Any desired switching means may be provided for controlling the lights 51, either manually or automatically in accordance with the position of the lid and its associated mechanism, in a known manner.

Fixed on either side of the receptacle 24 are horn arms 55, adapted, when either is pressed to close a switch 56 of any desired construction, to close an electrical circuit through a wire 57 which also extends upwardly through the post 16 in such manner as to blow the horn.

From the foregoing it will be seen that there is herein provided an improved receptacle adapted to be affixed within the rim of the steering wheel of a vehicle, which may contain any desired material, as for example cigarettes, as indicated at 60 in Figure 4, or a notebook 61, a mirror 62 beneath the notebook, or any other desired material. It will be seen that the receptacle is so positioned as not to interfere with the operation of the vehicle, or the driver's visibility, and it will correspondingly be seen that the cover members are so arranged that when opened they do not extend to any material extent out of the normal horizontal plane of the device, and thus provide no obstruction to the vision of the driver when the vehicle is in operation.

It will also be seen that there is herein provided a device which accomplishes all the objects of this invention and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A receptacle adapted to be mounted within the rim of the steering wheel of a vehicle, comprised of a cylindrical body portion, and two semi-circular cover members, and means to raise each of said cover members above the opposite member in said manner that it may be rotated in a horizontal plane to overlie the opposite cover member, and open half of the receptacle, said means comprising posts secured to the underside of each of said cover members, sleeves in said body surrounding said posts and spring means in said sleeve biasing said posts upwardly.

2. A receptacle adapted to be mounted within the rim of the steering wheel of a vehicle, comprised of a cylindrical body portion, and two semi-circular cover members, means to raise each of said cover members above the opposite member in said manner that it may be rotated in a horizontal plane to overlie the opposite cover member, and open half of the receptacle, said means comprising posts secured to the underside of each cover member, sleeves in said body surrounding said posts, spring means in said sleeve biasing said posts upwardly, and releasable latch means holding said posts against the bias of said springs.

3. A receptacle adapted to be mounted within the rim of the steering wheel of a vehicle, comprised of a cylindrical body portion, and two semi-circular cover members, and means to raise each of said cover members above the opposite member in such manner that it may be rotated in a horizontal plane to overlie the opposite cover member, and open half of the receptacle, said means comprising posts secured to the underside of each of said cover members, sleeves in said body surrounding said posts, spring means in said sleeve biasing said posts upwardly, said sleeves having slots therein, and pins secured to said posts extending outwardly through said slots; and latch means releasably engaging said pins.

4. A receptacle adapted to be mounted within the rim of the steering wheel of a vehicle, comprised of a cylindrical body portion, and two semi-circular cover members, and means to raise each of said cover members above the opposite member in said manner that it may be rotated in a horizontal plane to overlie the opposite cover member, and open half of the receptacle, said means comprising posts secured to the underside of each of said cover members, sleeves in said body surrounding said posts, spring means in said sleeves biasing said posts upwardly, said sleeves having slots therein, and pins secured to said posts extending outwardly through said slots, and latch means releasably engaging said pins, said latch means extending exteriorly of said body at points adjacent the driver of said vehicle.

5. The combination with the steering wheel, steering sleeve and stationary post of a motor vehicle, of a receptacle for the temporary storage of articles, means mounting said receptacle on said post within the rim of the steering wheel, said receptacle comprising a cylindrical body portion, a partition dividing said body portion into two compartments, and a separate semi-circular cover for each compartment, and means for mounting each of said cover members for rotation in a horizontal plane to open or close the compartment covered thereby.

6. The combination with the steering wheel, steering sleeve and stationary post of a motor vehicle, of a receptacle for the temporary storage of articles, means mounting said receptacle on said post within the rim of the steering wheel, said receptacle comprising a cylindrical body portion, a partition dividing said body portion into two compartments, and a separate semi-circular cover member for each compartment, and means to raise each of said cover members above the opposite cover member in such manner that it may be rotated in a horizontal plane to overlie the opposite cover member and open the compartment covered thereby.

WILLIAM L. LANGLEY.

REFERENCES CITED

The following references are of record in the file of this patent:

UNITED STATES PATENTS

| Number | Name | Date |
| --- | --- | --- |
| 1,152,286 | Brownson | Aug. 31, 1915 |
| 1,159,198 | Elliott | Nov. 2, 1915 |
| 1,160,061 | Friberg | Nov. 9, 1915 |
| 1,270,288 | Gruber | June 25, 1918 |
| 1,396,195 | Grigsby | Nov. 8, 1921 |
| 1,494,899 | Gates | May 20, 1924 |
| 1,692,601 | Wheeler | Nov. 20, 1928 |
| 2,353,806 | Blay et al. | July 18, 1944 |